United States Patent [19]

Holzrichter

[11] Patent Number: 4,474,939
[45] Date of Patent: Oct. 2, 1984

[54] METHOD OF MAKING SELECTED POLYESTERS

[75] Inventor: Edward J. Holzrichter, Redlands, Calif.

[73] Assignee: Whittaker Corporation, Los Angeles, Calif.

[21] Appl. No.: 565,302

[22] Filed: Dec. 27, 1983

[51] Int. Cl.³ .............................................. C08G 63/18
[52] U.S. Cl. ................................. 528/272; 528/308.2; 528/308.7
[58] Field of Search ................... 528/272, 308.3, 308.7

[56] References Cited

U.S. PATENT DOCUMENTS

| | | | |
|---|---|---|---|
| 4,128,535 | 12/1978 | Barker | 528/272 |
| 4,197,353 | 4/1980 | Tobias et al. | 528/308.7 |
| 4,259,478 | 3/1981 | Jackson et al. | 528/272 X |
| 4,338,431 | 7/1982 | König et al. | 528/272 |

Primary Examiner—Lucille M. Phynes
Attorney, Agent, or Firm—Donald E. Nist

[57] ABSTRACT

The improved method of the present invention comprises making selected polyesters by condensation polymerization of polycarboxylic acids with a plurality of diols, the diols being in a eutectic mixture having a melting point below that of the individual diols in the mixture. Thus, the eutectic mixture is charged in the liquid state with a sufficient amount of the acid and reacted under condensation conditions to form an ester and to polymerize the ester to the desired extent. A substantial saving in the amount of labor necessary to prepare the polyester is provided by the present method. The diols are preferably selected from the group consisting of neopentyl glycol, trimethyl pentanediol, cyclohexane dimethanol, and 1,6 hexanediol. Usually two diols are employed to form the eutectic mixture. They are normally waxy solids at ambient temperature, but are liquid when mixed in the proper proportions to provide the eutectic. Usually the molar ratio of the eutectic mixture of the two diols varies between about 30:70 and about 70:30. One preferable eutectic mixture comprises neopentyl glycol and 1,6 hexanediol in a molar ratio of about 1:1.

10 Claims, No Drawings

METHOD OF MAKING SELECTED POLYESTERS

BACKGROUND OF THE INVENTION

1. Field of the Invention

The present invention generally relates to polyesters and more particularly relates to an improved method of making polyesters, while utilizing an eutectic mixture of diols.

2. Prior Art

Industrial quantities of polyesters are manufactured utilizing normally solid diols, that is diols which are solid at ambient temperature. Such diols include neopentyl glycol, trimethyl pentanediol, cyclohexane dimethanol, and 1,6 hexanediol. Some industrial techniques consume large quantities of energy in maintaining the solid diols in the liquid state so that they can be pumped into the reactor and react with the polycarboxylic acids to form the desired esters and polymerize to polyesters. However, it is difficult, time consuming and expensive to physically transfer waxy, solid diol to a reactor by hand. 1,6 hexanediol can be handled in drums, but it must be melted to use. During the melting, much heat is lost. When the diol is finally melted, it must be used immediately in order to avoid a further heat expenditure. Sometimes solid diol is dissolved in water to form an aqueous solution. However, the added energy needed to evaporate the water and the necessity for stainless steel storage containers and associated piping make this modification less than satisfactory.

In view of the very large quantities of waxy, solid diols which are being used to manufacture a wide variety of products including films, clothing, etc., and further in view of the current need to conserve energy because of fuel shortages and pollution which results from fuel conversion for energy purposes, it would be highly desirable to provide an improved method of handling solid diols. Such method should be less expensive, utilize less energy, and facilitate the storage, transportation and use of the polyester-making components. Such method should also be capable of reducing the overall time necessary for charging the components into the reactor.

SUMMARY OF THE INVENTION

The improved method of making polyesters in accordance with the present invention satisfies all the foregoing needs. The method is substantially as set forth in the Abstract above. Thus, the method employs stable liquid eutectic mixtures of diols, which eutectic mixtures can be stored in the liquid state at ambient temperature and withdrawn therefrom for immediate use in the polyester-making procedure. The diols utilized as components of the liquid eutectic mixture are normally solid at ambient temperature and if used in accordance with conventional practice, would require substantial time and energy expenditure before they could be used for the polyester-making procedure.

In accordance with the present method, the liquid eutectic mixture of diols is reacted with a sufficient amount of polyester-forming organic acid, specifically polycarboxylic acid to form esters which polymerize under the reaction conditions to the desired polyesters. Preferably, the diols are selected from the group consisting of neopentyl glycol, 1,6 hexanediol, cyclohexane dimethanol, trimethyl prentanediol, and mixtures thereof. There are usually two diols in the eutectic mixture, although more than two diols could be used in such mixture. The molar ratio of the two diols in the eutectic mixture usually varies from about 1.2:1.0 to about 1.0:1.2, and in most instances are usually about 1:1.

Although substantial energy is required to initially melt the individual diols which will form the eutectic mixture, the eutectic mixture when formed remains in the liquid state at ambient temperature. Moreover, the energy in the initial melting can be expended under conditions which maximize its efficiency of use, minimize pollution and provide a liquid product which is easier to store and transfer from storage to the polymerization reaction zone, and otherwise is more suitable for use than the separate diols. The liquid eutectic mixture is stable for long periods of time at ambient temperature.

It is most preferred from an economical standpoint that the liquid eutectic mixture be formed from molten diols as soon as or soon after they pass from their formation reactors, thus enabling the resulting eutectic mixture to be kept liquid without reheating it and without any additional expenditure of energy. However, it is also possible to mix together selected solid diols in the appropriate proportions and thus form the desired liquid eutectic mixture without the application of heat to the diols, the only energy thereby expended being that required for the mixing operations.

Further advantages of the present invention are set forth in the following detailed description.

DETAILED DESCRIPTION

In accordance with the improved method of the present invention of the manufacture of solid polyester, a mixture of diols in proportions which will produce an eutectic mixture thereof, which mixture is liquid at ambient temperature, is provided. The diols are selected from the group consisting of neopentyl glycol, cyclohexanedimethanol, trimethyl pentanediol and 1,6 hexanediol. Neopentyl glycol is otherwise known as 2,2-dimethyl-1,3 propanediol and has a melting point approximately 120°–130° C. 1,6 hexanediol has a melting point of about 41°–42° C. Cyclohexane-dimethanol is 1-4 cyclohexanedimethanol and has a melting point of approximately 41°–61° C. Trimethyl pentanediol is 2,2,4-trimethyl-1,3-pentanediol and has a melting point of about 46°–55° C. As can be seen, each of these four diols has a melting point well above normal ambient temperatures of, for example, 65°–75° F. Thus, all four diols are waxy solids at ambient temperature and as such provide substantial problems in handling and transportation thereof.

Eutectic mixtures of two or more of the diols listed above can be formed by initially melting the diols and then mixing them together in the proper molar proportions, or by initially melting one or more of the diols and dissolving the remaining one or number of diols in the molten diols in the proper proportions. Preferably, however, the eutectic mixture is formed from diols while they are still in the molten state following their formation by chemical reaction, as in the industrial production thereof. It is also possible to mix together suitable proportions of the solid diols so that when they are intimately mixed they form the desired liquid eutectic mixture. The thus formed liquid eutectic mixture is one which remains liquid at normal room temperature of about 70°–75° F. and can be easily transported to a reactor and therein reacted with a sufficient amount of polyester-forming carboxylic acid under conditions which produce the ester and effect polymerization thereof to the desired polyester. Polymerization-promoting agents may be present and the reaction time and temperature are sufficient to provide the desired results.

Any suitable ester and polyester formation conditions can be employed. As a typical example, the eutectic mixture of diols in liquid form can be mixed in the reactor with a suitable concentration of the selected carboxylic acid(s) and a minor proportion of dibutyl tin oxide which acts as a promoter. The mixing occurs in the presence of inert gas. Sufficient heat is applied to the reactor, for example, heat sufficient to raise the reaction mixture to 420°-430° F. to cause the desired reactions. The reaction mixture is held in the reactor at that temperature until the acid value drops below a predetermined level, for example 3, indicating essential completion of the reaction. The following specific examples further illustrate certain features of the present invention.

EXAMPLE I

Table I below sets out the general results obtained from experiments designed to form liquid eutectic mixtures from various mixtures of the diols neopentyl glycol (NPG), 1,6 hexanediol (1,6 HD), trimethyl pentanediol (TMPD), and cyclohexane dimethanol (CHDM).

clear, that is free of crystals after 4½ hours, it was then immersed in a 90° F. water bath until it became clear. Time and temperature were regularly recorded during this portion of the analysis as well. The samples were periodically stirred, if liquid.

The freezing range values for the samples of the mixtures of diol were determined by placing 250 ml. samples in 600 ml. beakers, melting the samples and stirring them, then cooling them to room temperature, covering them and placing them in a refrigerator and holding them at 0° C. They were observed at regular intervals over a 4½ hour period to determine the time and temperature at which any crystallization occurred. The samples remained in the refrigerator overnight, and final temperature and physical state observations were recorded immediately after removing from the refrigerator. The samples were not agitated during this test but the bottoms of the beakers were scratched to help induce crystallization.

The results of the tests as summarized in Table I indicate that a stable liquid eutectic mixture of neopentyl glycol and 1,6 hexanediol occurred when the molar ratio of the neopentyl glycol to the 1,6 hexanediol was about 50:50 to about 40:60. A stable liquid eutectic mixture was also formed when neopentyl glycol was used in a molar ratio to cyclohexane dimethanol of 50:50.

TABLE I

| | | General Results of Eutectic Mixture Studies | | | | |
|---|---|---|---|---|---|---|
| Eutectic Mixture | Molar Ratio | Gardner Viscosity | WPG | Freezing Range (°C.) | Melting Range (°C.) | Ambient (70° F.) Stability |
| NPG-1,6 HD | 70 30 | Not available. Solid at room temperature. | — | — | — | Poor, liquid crystallized in less than 24 hours. |
| NPG-1,6 HD | 60 40 | | — | — | — | Poor, liquid crystallized in less than 24 hours. |
| NPG-1,6 HD | 50 50 | J | 8.13 | 9.0-2.5 | 16-25 | Good, liquid stable at room temp. after 14 days. |
| NPG-1,6 HD | 40 60 | I+ | — | — | 19-29.5 | Good, liquid stable at room temp. after 1 day. |
| NPG-1,6 HD | 30 70 | Not available. Solid at room temperature. | — | — | — | Poor, liquid crystallized in less than 24 hours. |
| NPG-CHDM | 50 50 | Z1-½ | 8.48 | Supercooled (did not freeze) | 19-23 | Good, liquid stable at room temp. after 14 days. |
| NPG-TMPD | 50 50 | T— | 8.02 | Supercooled (did not freeze) | 24-30 after 3 days. | Poor, liquid crystallization |
| 1,6 HD-CHDM | 50 50 | U¾ | 8.40 | 6.5-3.0 | 10-21 | Good, liquid stable at room temp. after 14 days. |
| 1,6 HD-TMPD | 50 50 | J— | 8.01 | 8.0-3.0 | 23-31 | Good, liquid stable at room temp. after 14 days. |
| CHDM-TMPD | 70 30 | Z3+⅛ | — | < −9.0 | — | Good, liquid stable at room temp. after 1 day. |
| CHDM-TMPD | 60 40 | Z2— | — | < −7.5 | — | Good, liquid stable at room temp. after 1 day. |
| CHDM-TMPD | 50 50 | Z1 | 8.25 | <3.0 | < −3 | Good, liquid stable at room temp. after 14 days. |
| CHDM-TMPD | 40 60 | Y | — | Supercooled (did not freeze) | — | Good, liquid stable at room temp. after 1 day. |
| CHDM-TMPD | 30 70 | W+ | — | Supercooled (did not freeze) | — | Good, liquid stable at room temp. after 1 day. |

In the tests set forth in Table I above, the melting range values of the diol mixtures were determined by the following procedure: approximately 250 ml. samples of the test mixtures of diols were placed in 600 ml. beakers, then fully melted and stirred under heat, then covered and placed in a freezer after cooling to room temperature. The freezer temperature was −5° C. The samples were held overnight in the freezer, then held at room temperature (23° C.) and the time and temperature at which melting thereof occurred were determined. If the particular liquid sample was not totally Similar results were obtained by utilizing 1,6 hexanediol and either cyclohexane dimethanol or trimethyl pentanediol in a molar ratio of about 50:50. Extended tests indicated that stable liquid eutectic mixtures of cyclohexane dimethanol and trimethyl pentanediol could be formed where the molar ratio of cyclohexane dimethanol to trimethyl pentanediol varied between 70:30 and 30:70.

EXAMPLE II

A liquid eutectic mixture of 1,4 cyclohexane dimethanol and neopentyl glycol in a molar ratio of 60:40 was formed by initially melting the two diols separately and then mixing them together in the liquid state. This liquid eutectic mixture was then added at 70° F. in a 76.1 lb. amount to a reactor, along with 29.13 lbs. of maleic anhydride and 0.10 lbs. of dibutyl tin oxide. The reactor was purged with a strong flow of inert gas and heat was added to the reactor to bring the reaction mixture temperature up to 420°–430° C. and melt the maleic anhydride. When the desired temperature was reached the flow of inert gas was reduced to a moderate sparge. The mixture was held in the reactor at reaction temperature until the acid value of the mixture dropped to less than 3. The product (polyester A) was then withdrawn from the reactor and exhibited the following characteristics.

TABLE II

| | |
|---|---|
| Viscosity: | Heavy Balsam |
| NVM: | 100% |
| AV/NV: | Less than 3 |
| Color: | 1 |
| WPG: | 9.23 lb. |
| Appearance: | Bright and Stable |

A conventional polyester (polyester B) was prepared from a single diol for comparison with polyester A. The formulation for polyester B is set forth below in Table III.

TABLE III

| Formulation: 100 lb. NVM | |
|---|---|
| 1,4 cyclohexane dimethanol | 78.15 lb. |
| maleic anhydride | 26.62 lb. |
| dibutyl tin oxide | .10 lb. |
| | 104.87 lb. solids charge |
| | 4.87 lb. water of esterification |
| | 100.00 lb. non volatile yield |

The procedure for making the polyester B was similar to the procedure for making polyester A. The physical characteristics of polyester B are set forth in Table IV below.

TABLE IV

| | |
|---|---|
| Viscosity: | Heavy Balsam |
| NVM: | 100% |
| AV/NV: | Less than 3 |
| Color: | 1 |
| WPG: | 9.24 lb. |
| Appearance: | Tendency to crystallize |

Polyesters A and B were then utilized in comparable high solids coating compositions and their characteristics were determined. The formulations for coating composition "X" containing polyester A and coating composition "Y" containing polyester B are set forth in Table V below.

TABLE V

| Ingredients | Coating X | Coating Y |
|---|---|---|
| polyester A | 21.81 wt. % | |
| polyester B | | 26.48 wt. % (80% in butyl cellosolve |
| melamine resin | 64.85 wt. % (98% in butanol) | 63.56 wt. % |

TABLE V-continued

| Ingredients | Coating X | Coating Y |
|---|---|---|
| silicone resin (10% in butanol) | 4.24 wt. % | 4.24 wt. % |
| butyl cellosolve | 9.1 wt. % | 5.72 wt. % |

Coating X exhibited a higher viscosity than coating Y, the same gloss, cross hatch cure and resistance to methyl ethyl ketone and better resistance to crystallization. The flow of the coatings was approximately the same. Thus, it was shown that polyester A imparted to coating X improved physical characteristics when compared with the results obtained by utilizing polyester B, a conventional polyester in a comparable coating formulation, coating Y. Not only are energy savings obtained through the use of eutectic mixture of diols in the present method for the preparation of polyesters, but the polyesters themselves exhibit some improved physical characteristics.

Other advantages of the present invention are set forth in the foregoing. Various modifications, changes, alterations and additions can be made in the improved method of the present invention, its steps and parameters. All such modifications, changes, alterations and additions as are within the scope of the appended claims form part of the present invention.

What is claimed is:

1. An improved method of making selected polyesters, said method comprising:
   a. forming a eutectic mixture of a plurality of diols suitable for use in the preparation of polyesters, said eutectic mixture having a melting point below that of the individual diols in said mixture;
   b. reacting the eutectic mixture in the liquid state with sufficient amount of polyester-forming organic acid under conditions to form an ester and effect polymerization of the same and thereafter recovering the resulting polyester, said method effecting a saving in the amount of time and energy necessary to prepare said polyester.

2. The improved method of claim 1 wherein said diols are selected from the group consisting of neopentyl glycol, 1,6 hexane diol, cyclohexane dimethanol, trimethyl pentane diol, and mixtures thereof.

3. The improved method of claim 1 wherein two diols form said eutectic mixture.

4. The improved method of claim 1 wherein said diols are melted to form said eutectic mixture.

5. The improved method of claim 3 wherein the molar ratio of said two diols varies between about 30:70 and about 70:30.

6. The improved method of claim 2 wherein said eutectic mixture comprises neopentyl glycol and 1,6 hexane diol in a molar ratio of about 50:50 to about 40:60.

7. The improved method of claim 2 wherein said eutectic mixture comprises neopentyl glycol and cyclohexane dimethanol in a molar ratio of about 50:50.

8. The improved method of claim 2 wherein said eutectic mixture comprises 1,6 hexane diol and cyclohexane dimethanol in a molar ratio of about 50:50.

9. The improved method of claim 2 wherein said eutectic mixture comprises 1,6 hexane diol and trimethyl pentane diol in a molar ratio of about 50:50.

10. The improved method of claim 2 wherein said eutectic mixture comprises cyclohexane dimethanol and trimethyl pentane diol in a molar ratio of about 30:70 to about 70:30.

* * * * *

REEXAMINATION CERTIFICATE (945th)

United States Patent [19]

Holzrichter

[11] B1 4,474,939

[45] Certificate Issued Nov. 8, 1988

[54] METHOD OF MAKING SELECTED POLYESTERS

[75] Inventor: Edward J. Holzrichter, Redlands, Calif.

[73] Assignee: Whittaker Corporation, Los Angeles, Calif.

Reexamination Request:
No. 90/001,326, Sep. 10, 1987

Reexamination Certificate for:
Patent No.: 4,474,939
Issued: Oct. 2, 1984
Appl. No.: 565,302
Filed: Dec. 27, 1983

[51] Int. Cl.$^4$ .................................................. C08G 63/18
[52] U.S. Cl. ................................... 528/272; 528/308.2; 528/308.7
[58] Field of Search .................... 528/272, 308.3, 308.7

[56] References Cited

U.S. PATENT DOCUMENTS

| | | | |
|---|---|---|---|
| 3,243,413 | 3/1966 | Bell et al. | 528/295 |
| 3,538,187 | 11/1970 | Feltzin | 525/41 |
| 3,560,445 | 2/1971 | Fekete et al. | 528/303 |
| 3,957,906 | 5/1976 | Buzbee et al. | 525/40 |
| 4,052,358 | 10/1977 | Wada et al. | 523/526 |
| 4,197,353 | 4/1980 | Tobias et al. | 428/458 |
| 4,362,825 | 12/1982 | Grabhoefer et al. | 521/172 |
| 4,487,979 | 12/1984 | Gaughan | 568/816 |

FOREIGN PATENT DOCUMENTS

0017060  10/1980  European Pat. Off.
975303   11/1964  United Kingdom.

OTHER PUBLICATIONS

"Uber Hydroaromatische Polyester, ein experimenteller Beitrag zur Theorie der Faser Bildung", *Makromol. Chem.* 14, 179, Batzer, et al. (1954).

1,4-Cyclohexanedimethanol Properties . . . Reactions, Eastman Kodak Jul. 1965, "Crystallization in High Polymers V. Dependence of Meeting Temperatures of Polyesters and Polyamides on Composition and Molecular Weight."

Evans, et al., *J. Am. Chem. Soc.*, 72, 2018–2028 (1950).
Boenig, *Unsaturated Polyesters*, Elsevier Publishing Co., New York, 1964, pp. 67–69.
McElvain *The Characterization of Organic Compounds*, MacMillan ©1953, pp. 6, 17–18, 36.
Helmkamp, et al., *Selected Experiments in Organic Chemistry, W. H. Freeman & Co.*, ©*1964, 1968, p. 6.*
Lee, et al., *Handbook of Epoxy Resins*, McGraw Hill, ©1967, pp. 8-12–8-16 and 12-33–12-33–12-36.
J. Buckingham, Ed. Dictionary of Organic Compounds, 5th Ed., Chapman and Hall, New York, ©1982, pp. 553–554, 712, 904, 1365–1366, 1459, 2212, 2917, 4379, 4465, 4535.
Aldrich Fine Chemicals Catalog 1986–87, Aldrich Chem. Co., Inc., 940 W. St. Paul Ave., Milwaukee, Wis. 53233; p. 1245, ©1986.
Fluka Catalog 14 (1984–85), Fluka Chemical Corp., 255 Oser Ave., Hauppauge, N.Y. 11788, ©1984; p. 944.
Chemical Abstracts, American Chemical Society, Pub., 72:90052 g (1970).

*Primary Examiner*—John Kight

[57] ABSTRACT

The improved method of the present invention comprises making selected polyesters by condensation polymerization of polycarboxylic acids with a plurality of diols, the diols being in a eutectic mixture having a melting point below that of the individual diols in the mixture. Thus, the eutectic mixture is charged in the liquid state with a sufficient amount of the acid and reacted under condensation conditions to form an ester and to polymerize the ester to the desired extent. A substantial saving in the amount of labor necessary to prepare the polyester is provided by the present method. The diols are preferably selected from the group consisting of neopentyl glycol, trimethyl pentanediol, cyclohexane dimethanol, and 1,6 hexanediol. Usually two diols are employed to form the eutectic mixture. They are normally waxy solids at ambient temperature, but are liquid when mixed in the proper proportions to provide the eutectic. Usually the molar ratio of the eutectic mixture of the two diols varies between about 30:70 and about 70:30. One preferable eutectic mixture comprises neopentyl glycol and 1,6 hexanediol in a molar ratio of about 1:1.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 4 and 5 are cancelled.

Claims 1 and 6-10 are determined to be patentable as amended.

Claim 3, dependent on an amended claim is determined to be patentable.

New claim 11 is added and determined to be patentable.

1. An improved method of making selected polyesters, said method comprising
   a. [forming a eutectic mixture of a plurality of diols suitable for use in the preparation of polyesters, said eutectic mixture having a melting point below that of the individual diols in said mixture] *separately forming at least two molten diols, which diols are solid at ambient temperature, said diols being selected from the group consisting of neopentyl glycol, 1,6 hexanediol, cyclohexane dimethanol and trimethyl pentanediol, and while said formed diols are still molten forming an eutectic mixture therefrom, which eutectic mixture remains liquid at ambient temperature*; and,
   b. reacting the eutectic mixture in the liquid state with sufficient amount of polyester-forming organic acid under conditions to form an ester and effect polymerization of the same and thereafter recovering the resulting polyester, said method effecting a saving in the amount of time and energy necessary to prepare said polyester.

6. The improved method of claim [2] *1* wherein said eutectic mixture comprises neopentyl glycol and 1,6 hexane diol in a molar ratio of about 50:50 to about 40:60.

7. The improved method of claim [2] *1* wherein a said eutectic mixture comprises neopentyl glycol and cyclohexane dimethanol in a molar ratio of about 50:50.

8. The improved method of claim [2] *1* wherein said eutectic mixture comprises 1,6 hexane diol and cyclohexane dimethanol in a molar ratio of about 50:50.

9. The improved method of claim [2] *1* wherein said eutectic mixture comprises 1,6 hexane diol and trimethyl pentane diol in a molar ratio of about 50:50.

10. The improved method of claim [2] *1* wherein said eutectic mixture comprises cyclohexane dimethanol and trimethyl pentane diol in a molar ratio of about 30:70 to about 70:30.

11. *The method of claim 1 wherein the ambient temperature is in a range of approximately 65°-75° F.*

* * * * *